United States Patent [19]

Landen

[11] 4,181,144

[45] Jan. 1, 1980

[54] HYDRAULICALLY LIMITED FUEL INJECTION NOZZLE

[75] Inventor: Ernest W. Landen, Peoria, Ill.

[73] Assignee: Caterpillar Tractor Co., Peoria, Ill.

[21] Appl. No.: 863,489

[22] Filed: Dec. 22, 1977

[51] Int. Cl.² .............................................. F16K 17/34
[52] U.S. Cl. .................................. 137/484.4; 137/541; 239/533.2; 239/453
[58] Field of Search ............. 137/471, 484.2, 541, 137/484.4; 239/533.2, 533.5, 533.7, 533.9, 453; 123/33 J

[56] References Cited

U.S. PATENT DOCUMENTS

| | | | |
|---|---|---|---|
| 146,873 | 1/1874 | Cockburn | 137/471 |
| 2,962,227 | 11/1960 | Whitehurst | 239/453 |
| 3,143,163 | 8/1964 | Renner | 137/494 X |
| 3,444,886 | 5/1969 | Bailey | 239/533.7 X |
| 3,450,353 | 6/1969 | Eckert | 239/453 X |
| 4,034,917 | 7/1977 | Bailey | 239/533.7 X |

*Primary Examiner*—Harold W. Weakley
*Attorney, Agent, or Firm*—Hugh D. Finley

[57] ABSTRACT

A hydraulically limited fuel injection nozzle includes a lift control washer disposed about an elongated check valve stem so that the washer cooperates with a surrounding sleeve when acted upon by a pressure difference caused by fluid flow to control lift of the check valve. The arrangement moves the main flow restriction upstream of check valve.

1 Claim, 6 Drawing Figures

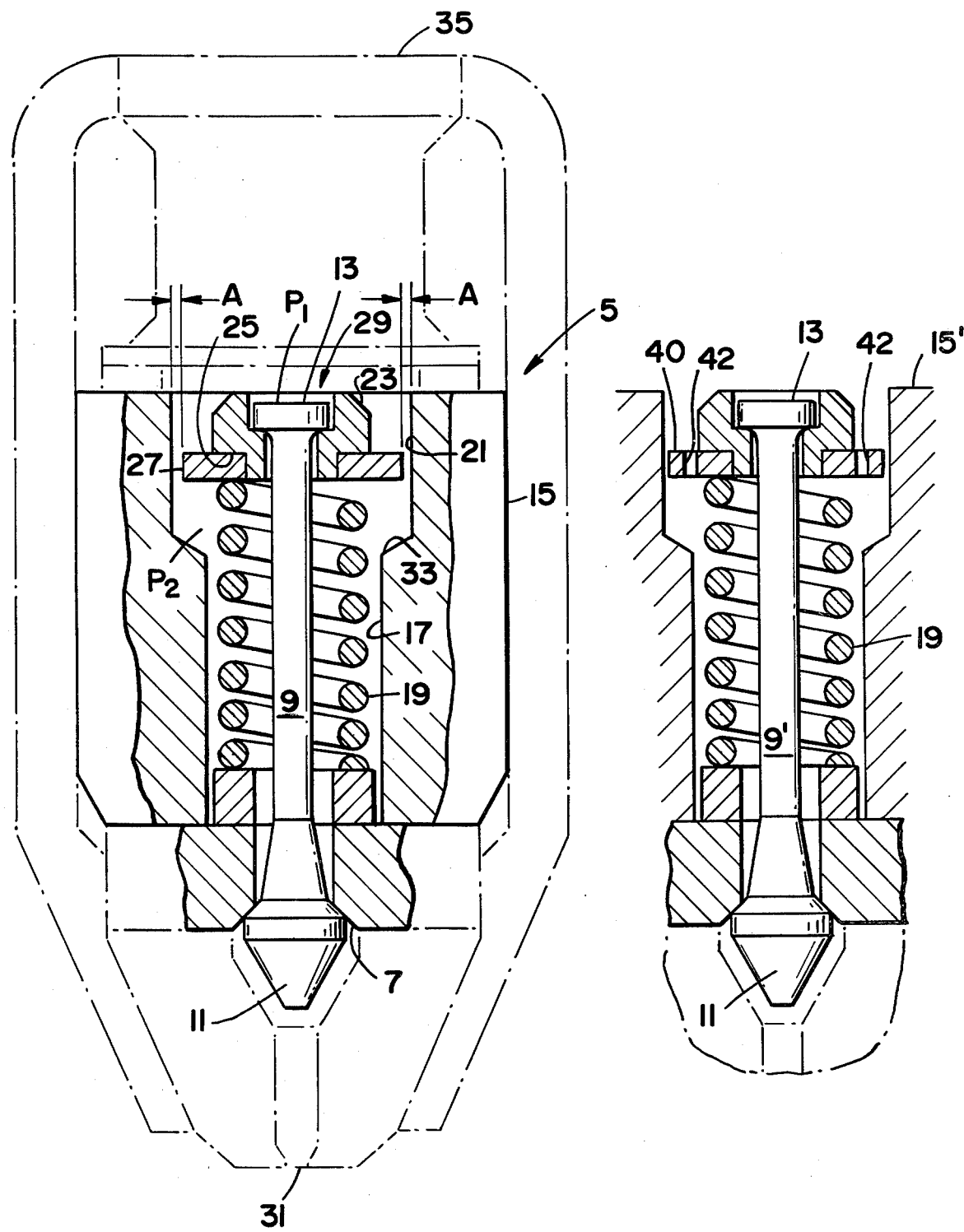
FIG_1
FIG_2

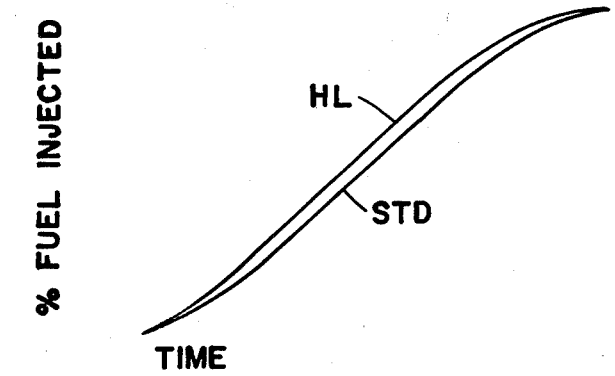
FIG_3
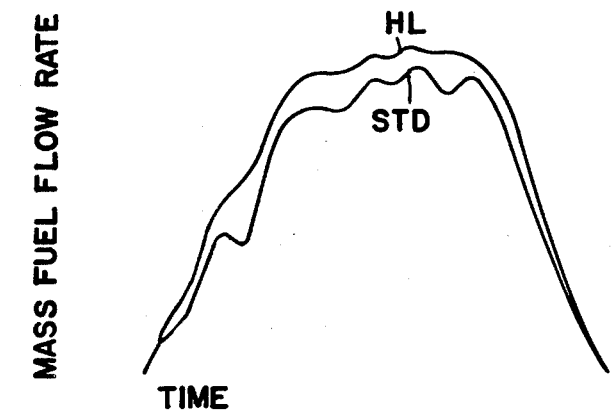
FIG_4
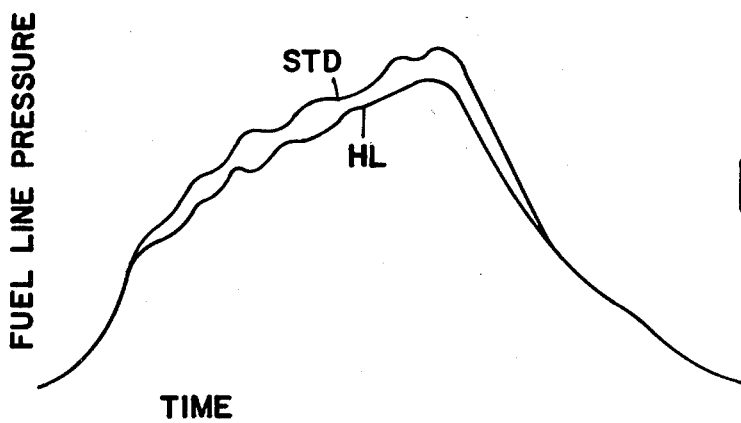
FIG_5
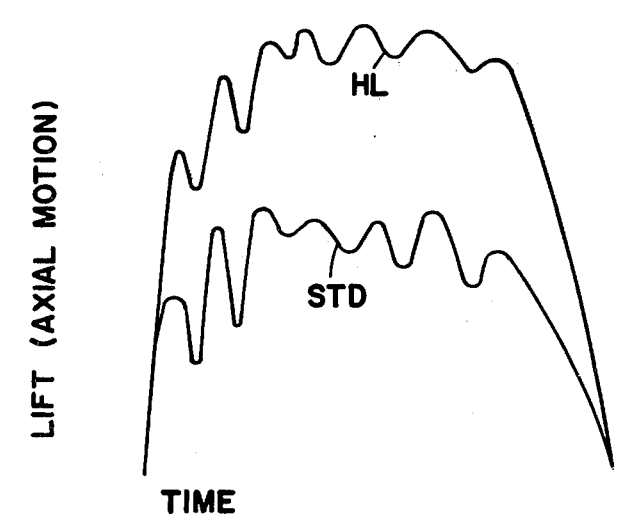
FIG_6 analogous washer and retainer in the standard check valve have a sufficiently small diameter relative the enclosing counter-bore so that flow thereby is not unduly restricted. Furthermore, some standard check valves may include a plurality of openings in the analogous washer to further enhance flow upstream of the valve seat. Normally seating while the valve is open of the standard check valve on the analogous surface is avoided.

Although the standard check valve, operating as described in adequate in lower powered engines, a higher "lift" is necessary for efficient and increased fuel flow in higher powered engines. Accordingly, in the fuel injector nozzle disclosed herein, the lift control washer 27 cooperates with sleeve 15 to control the amount of lift of the elongated check valve 9.

Check valve 9 opens under the force produced by pressureized fuel flow acting on enlarged end 11 upstream of seat 7. Once the valve is open flow through the annular area A between the lift control washer 27 and counter-bore 21 of sleeve 15 creates a hydrokinetic force to cooperate with force acting on enlarged end 11. The controlled annular flow area A may be defined as: $A=(\pi/4)(D_s^2-D_w^2)$. $D_s$ and $D_w$, as previously noted, are the diameters of the counter-bore 21 and the lift control washer 27, respectively. A force, F, acting on the elongated check valve 9 through the lift control washer, is controlled by the product of the pressure across this annular area A, where $P_1$ is the upstream pressure and $P_2$ is the downstream pressure, and the area is the area of counter-bore 21 blocked by the lift control washer 27, retainer 23, and elongated check valve 9, and equal to $(\pi/4)(D_s^2-D_w^2)$. Pressure difference, $P_1-P_2$, depends on the flow rate, Q, through the controlled flow area, A, and is determined by the equation derived from Bernoulli's law:

$$P_1-P_2=Q^2/(C^2A^22g/w)$$

in which:
Q is the flow rate through area A
C is the coefficient of discharge through area A
g is the acceleration of gravity
w is the specific weight of the fuel
$P_1$ is the pressure upstream of area A
$P_2$ is the pressure downstream of area A The force, F, which is the product of the defined $P_1-P_2$, and the area covered by the diameter of the washer and created by the fuel flow, opposes the spring force of resilient member 19.

In a compression ignition engine, such as a diesel engine, wherein such a fuel injection nozzle could be utilized, the pressure in the cylinder at the time of the injection may be determined. Accordingly, pressure, $P_1$, provided by the fuel pump, may be set sufficiently high to overcome compression and a spring rate chosen in resilient member 19 so that $P_1$ is sufficiently high to initially unseat enlarged end 11 from valve seat 7. Knowing these two factors, and utilizing the above equation, the area A may be determined to oppose the spring rate in resilient member 19. Conversely, given an area A and the compression ratio, the spring rate may be chosen. Allowing the lift of elongated check valve 9 to be controlled by pressure difference $P_1-P_2$ permits the check valve to "float" while open.

Comparison of a standard fuel injector nozzle and the high lift hydraulically controlled fuel injector nozzle is depicted in FIGS. 3 through 6. In particular, in FIG. 3, the line denoted "HL" (for high-lift) indicates the fuel is injected at a greater rate than in the standard fuel injection nozzle. Similarly, in FIG. 4, the amount of fuel injected over the same period of time is greater in the "HL" or high-lift injection nozzle as described herein. Significantly, in FIG. 5, a lower pressure is needed upstream in the fuel line in the high-lift valve as described herein, while in FIG. 6 it is clear that a greater amount of lift in the elongated check valve described herein is possible, while utilizing the hydraulic flow to control such lift. The greater lift allows a larger fuel flow rate at a lower pressure thus decreasing oscillation or lateral displacement of the elongated check valve member during lift.

In operation, the fuel injector nozzle 5 is positioned in a compression ignition engine or a spark ignited engine, as the case may be. Fuel is provided through aperture 35 from a conventional fuel pump and fuel line in a timed manner well known in the art and sufficient to overcome the spring force of resilient member 19. The pressure drop of fuel passing through the area A creates a force acting on lift control washer 27 to oppose the spring constant of resilient member 19 in accord with the formula set forth above, so that elongated check valve 9, which has been unseated from valve seat 7, floats on resilient member 19, as controlled by the force acting on lift control washer 27, allowing fuel to pass through injection port 31 to the associated cylinder at a lower pressure and at a higher rate than in a standard nozzle.

An alternate embodiment of the above application is shown in FIG. 2, wherein similar elements are used throughout the fuel injection nozzle with modification made to the lift control washer. In this alternate embodiment, a lift control washer 40 is constructed with a plurality of axial apperatures 42, each forming an orifice through flow control washer 40. Utilizing the same formula set forth above, the flow area is now: $A'=n\ d^2/4$, where n is the number of apperatures and d is the diameter of each individual aperture. To this area, A', should be added the small clearance between the lift control washer 40 and the sleeve 15'. Operation of the alternate embodiment is the same as the primary embodiment, with the pressure difference being determined utilizing the same formula.

Although this invention has been described in relation to two embodiments, it is not to be considered so limited, but rather is limited only by the following claims.

Embodiments of the invention in which an exclusive privilege or property is claimed are defined as follows:

1. In an injection nozzle operable by fluid under pressure including a cylindrical valve body assembly having a portion defining a valve seat; an elongated check valve having an enlarged first end to engage the valve seat and an enlarged second end; a sleeve disposed about said check valve and disposed in said valve body assembly, said sleeve associating said check valve with said valve body assembly; resilient means disposed between said seat and said enlarged second end and interior of said sleeve, said resilient means for urging said check valve into engagement with said seat, said check valve movable out of engagement with said seat by fluid under pressure acting on said first end thereby creating a flow of fluid through said sleeve, the improvement comprising lift control means including a lift control washer disposed between said second end of said elongated check valve and said resilient means, said lift

HYDRAULICALLY LIMITED FUEL INJECTION NOZZLE

BACKGROUND OF THE INVENTION

This invention relates to fuel injection nozzles, and particularly relates to outward opening valves, such as is shown in U.S. Pat. No. 3,444,886, to Bailey, et al, assigned to the same assignee hereof. More particularly, the invention is directed to a means for controlling axial movement of an elongated check valve element by the hydrokinetic action of the fuel being delivered by the check valve structure of the fuel injection nozzle.

Fuel injection nozzles, having disposed therein a check valve of the type described, operate at a high frequency determined by the operating speed of the associated engine. The basic nature of a compression ignition engine wherein the fuel injection nozzle is most commonly used requires an initially high fuel pressure in order to open the fuel nozzle at the appropriate time. Increases in horsepower ratings of the engine with the commensurate increase in temperature, increase the pressures to an even higher level and require a higher fuel flow through the valve.

Increased fuel flow can be accomplished in the limited time permitted by increasing the fuel pressure, or increasing the fuel flow velocity, or by decreasing restrictions in the fuel flow path between the check valve and the check seat.

Increasing fuel pressure or velocity between the check valve and the check seat is undesirable as such an increase in fuel velocity usually results in random motion of the check valve stem in lateral directions due to inconsistencies in the high pressure of the fluid and the effect of the rather high spring constant necessary to maintain the valve closed until fuel line pressure reaches the desired predetermined value.

Decreasing restrictions in the fuel flow path between the check valve and the check seat may be accomplished by increasing the lift of the check valve relative the seat. This has been accomplished in some cases by decreasing the spring constant. In many cases this has proved unsatisfactory as the valve opens early. In other cases a valve stop may be used. In either case, the random motion of the check valve stem caused by the high flow rate and high pressure have been disadvantageous.

It has been found that the varying pressures on two sides of a restriction in the nozzle can be utilized to control the amount of check valve lift, and thus increase flow rate through the check valve without an increase in pressure.

SUMMARY OF THE INVENTION

Accordingly, the present invention is an improvement to a fuel injection nozzle. The improved nozzle is operable by fluid under pressure and includes a cylindrical valve body assembly having a portion defining a valve seat, and an elongated check valve having an enlarged first end to engage the valve seat and an enlarged second end. A sleeve is disposed about the check valve and in the valve body. A resilient member is disposed between the valve seat and the enlarged second end to urge the check valve into engagement with the seat. The check valve is movable out of engagement with the seat by fluid under pressure acting on the first end creating a flow through the sleeve. The improvement includes a lift control washer disposed between the second end of the elongated check valve and the resilient member. The lift control washer cooperates with the sleeve to provide a pressure gradient in the flow of fluid passing thereby. The pressure gradient acts on the lift control washer to move the check valve further out of engagement with the seat so that a greater amount of fluid passes through the nozzle at a given pressure.

BRIEF DESCRIPTION OF THE DRAWINGS

FIG. 1 is a view, partly in section, of a hydraulically controlled fuel injection nozzle in accord with the present invention.

FIG. 2 is a cross-section of a portion of the nozzle shown in FIG. 1, modified to conform to an alternate embodiment.

FIG. 3 is a graph of the percent of fuel injected over the injection cycle in the fuel injection nozzle described herein in relation to a standard fuel injection nozzle.

FIG. 4 is a graph of the fuel flow rate during the same cycle through the standard nozzle and the nozzle described herein.

FIG. 5 is a graphical comparison of the fuel line pressure in the nozzle described herein and the standard nozzle.

FIG. 6 is a graphical representation of the lift or axial motion of the standard nozzle, as opposed to the nozzle described herein.

DETAILED DESCRIPTION OF THE PREFERRED EMBODIMENT

Referring to FIG. 1, a fuel injection nozzle 5, in accord with the provisions of this invention, is shown. The fuel injection nozzle 5 includes a cylindrical valve body assembly defining a discharge orifice means including a valve seat 7 in which the outward opening elongated check valve 9, which itself defines an enlarged end 11, may seat against. The valve body also defines an injection port 31 downstream of seat 11 for communicating fuel to an engine cylinder. Elongated check valve 9 also defines at the other opposite or second end a second enlarged end 13. The cylindrical valve body assembly is formed to allow a sleeve 15 to be disposed therein, so that sleeve 5 is disposed about the elongated check valve 9. Sleeve 15 is formed with an axial bore 17 of sufficient diameter to receive elongated check valve 9 and a resilient member 19, which will be described in greater detail. A counter-bore 21 may be formed at the end of sleeve 15 adjacent to second enlarged end 13.

Disposed about second enlarged end 13 and forming with sleeve 15 a flow control orifice means, is a retainer 23 which may be in two parts for ease of assembly as described in U.S. patent application Ser. No. 751,008 and which defines a shoulder 25 against which a lift control washer 27 may abut. The outside diameter of lift control washer 27, hereinafter referred to as $D_w$, is made a predetermined amount less than the diameter of counter-bore 21 (or bore 17 if counter-bore 21 is not present) which will hereinafter be referred to as $D_s$.

In known fuel injection nozzles, fuel is provided from a fuel pump at the analogous upper surface of the analogous check valve and the associated retainer to urge the check valve to an open position, thus permitting fuel to flow past the valve seat to an injection port. Normally, pressure $P_1$ applied to a standard check valve pressurizes the interior cavity and, when sufficient, operates on the analogous enlarged end to open the valve. The control means cooperating with said sleeve for providing a pressure gradient in a flow of fluid passing thereby, said pressure gradient acting on said lift control washer to move said check valve further out of engagement with said seat; whereby a relative greater amount of fluid is passed through the injection nozzle for a given pressure.

* * * * *